(No Model.)  J. J. ANDERSON.  2 Sheets—Sheet 2.
ROLLING MACHINERY.
No. 350,858.  Patented Oct. 12, 1886.
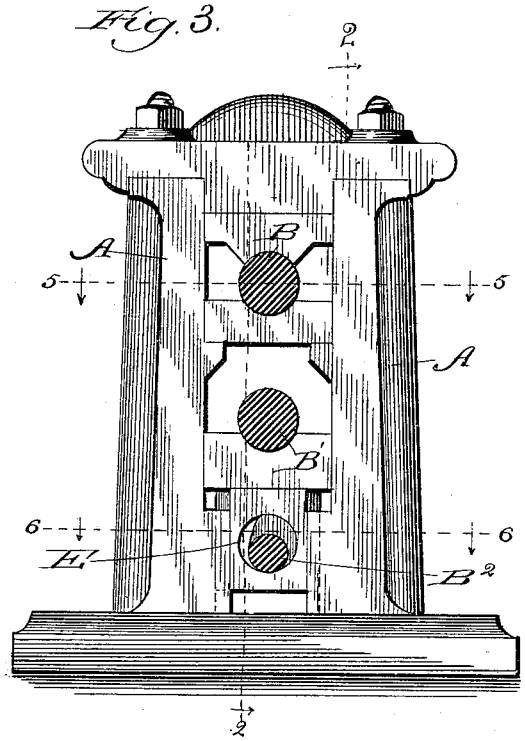
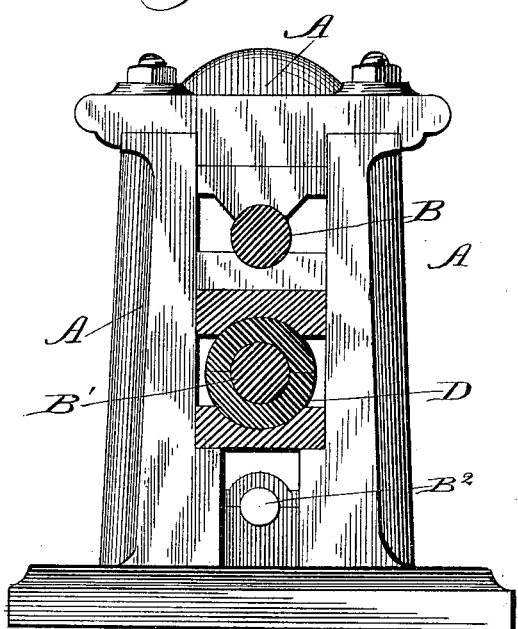
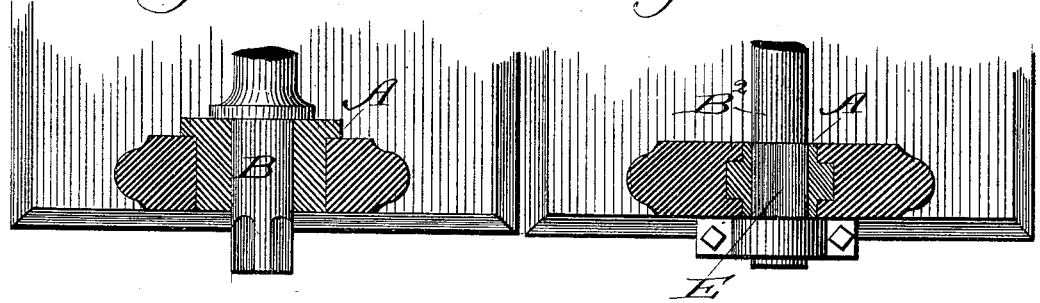
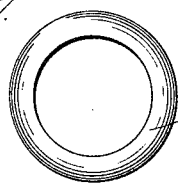
Witnesses:
Chas. E. Gaylord.
A. S. Pare
Inventor:
James J. Anderson
By Dyrenforth and Dyrenforth,
Att'ys

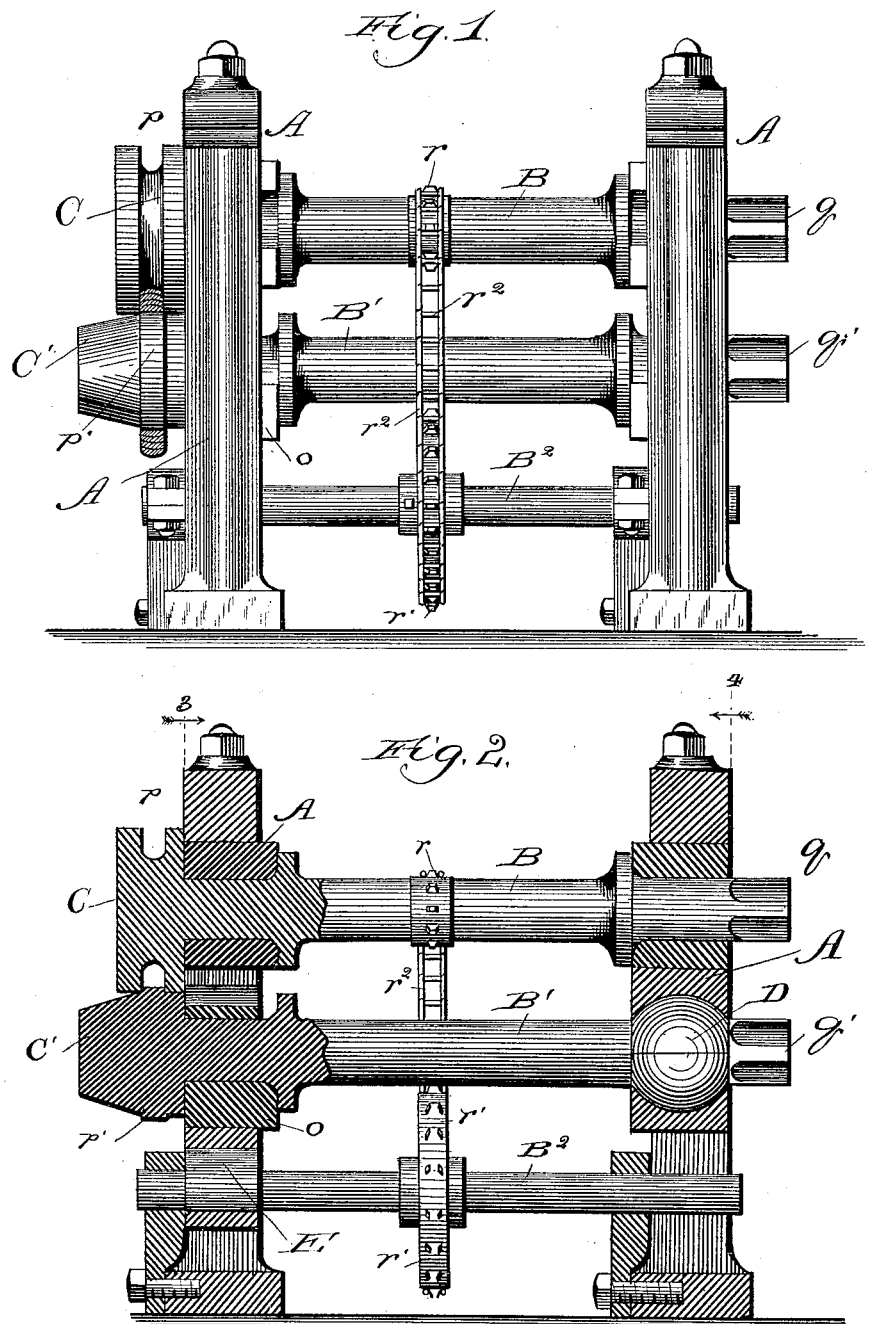

UNITED STATES PATENT OFFICE.

JAMES J. ANDERSON, OF CHICAGO, ILLINOIS, ASSIGNOR OF ONE-HALF TO ASA G. PETTIBONE AND A. H. MULLIKEN, BOTH OF SAME PLACE.

ROLLING MACHINERY.

SPECIFICATION forming part of Letters Patent No. 350,858, dated October 12, 1886.

Application filed February 9, 1886. Serial No. 191,299. (No model.)

*To all whom it may concern:*

Be it known that I, JAMES J. ANDERSON, a citizen of the United States, residing at Chicago, in the county of Cook and State of Illinois, have invented certain new and useful Improvements in Rolling Machinery; and I hereby declare the following to be a full, clear, and exact description of the same.

My present invention relates particularly to a machine for welding into a homogeneous annular body coiled metal bar, in forming the coupling-links for cars by first coiling the bar into the form of a ring in one machine, then welding it in a machine forming the subject of the present application, and, lastly, shaping it in another machine.

The coiling and shaping machines form the subjects of separate concurrent applications for Letters Patent with the present application.

It is my object to provide a rolling-machine particularly adapted to the purpose of welding metal coils into homogeneous annular bodies preparatory to shaping them into links, which shall, owing to the manner of their manufacture, be devoid of weak places produced by the more common manner of their manufacture—viz., welding together the ends of a bar formed into the proper shape.

My invention consists in the general construction of my improved machine; and it also consists in details of the construction and combinations of parts forming the same, all as hereinafter more fully set forth.

As in the machine forming the subject of my appplication, Serial No. 189,807, filed January 26, 1886, for a machine for rolling coupling-pins, my present invention contains the feature of the rolls located without the housings, instead of between them, as is the more common manner of adjusting the rolls, and I do not claim this construction, broadly, in the present application.

Referring to the drawings, Figure 1 is a side elevation of my improved machine; Fig. 2, a longitudinal vertical section of the same on the line 2 2 of Fig. 3; Fig. 3, a sectional end elevation taken on the line 3 3 of Fig. 2; Fig. 4, a similar view taken on the line 4 4 of Fig. 2; Fig. 5, a broken sectional plan view taken on the line 5 5 of Fig. 3; Fig. 6, a similar view taken on the line 6 6 of Fig. 3; Fig. 7, a plan view of the annular coil after being welded by the machine; and Fig. 8, a perspective view of a section of the welded annular coil.

A A are the housings for the spindles B, B', and $B^2$. The spindles B and $B^2$ are geared together to be driven in the same direction, preferably by means of the sprocket-wheels $r$ and $r'$, connected by a chain, $r^2$, as shown, the wheel $r'$ being preferably six times the diameter of the wheel $r$, for a purpose hereinafter described. Power may be applied to drive the spindles B and $B^2$ by means of the common coupling, $q$, provided on the end of the spindle B, and the spindle B' is driven toward the direction of rotation of the spindle B by similar means, $q'$, on the end adjacent to the device $q$.

On the opposite end of the spindle B, without the housing A, is a stationary roll, C, grooved, as shown at $p$ in Fig. 1, around its periphery, and on the adjacent end of the spindle B' is a roll, C', provided with a square collar, $p'$, to enter the groove $p$, and tapering toward its outer extremity, for a purpose hereinafter described. That portion of the housing A adjacent to the roll C', which contains the neck of the spindle B', to support the latter, is enlarged to permit approximately vertical play or oscillatory motion to that end of the spindle and the roll C', for which purpose the opposite end of the spindle B' is provided, preferably, with a ball-joint, D, as shown, or with a pivotal joint, and the spindle $B^2$ carries a cam, E, directly below the bearing $o$ of the spindle B', to raise the latter, with its bearing, from its seat and force the collar $p'$ against the groove $p$.

The machine thus described operates, as hereinbefore stated, to weld into a homogeneous body an annular coil of bar metal, the procedure being as follows: After forming the coil, as described in my aforesaid application for the coiling-machine, it is heated to a welding-heat and adjusted upon the collar $p'$, of the proper size to receive it, the tapering end of the roll C' affording a desirable guide in the adjustment of the coil, during which operation the spindle B' is in a downwardly-slanting position. The cam E in its revolution forces upward the spindle, B' compressing the coil into the groove of the roll C, whereby it is welded into a homogeneous body, F, rounded on its exterior and flat on its interior, owing to the respective shapes of the groove $p$ and collar $p'$. While the foregoing is the preferred form of link, being that at present most commonly desired by consumers, other forms may obviously be produced by suitably changing the operative part of a roll C or C', or both.

The machine is arranged properly to weld a coil with a given number of revolutions—say six—of the spindles B and B' during a single revolution of the cam E, which at the end of its revolution will have produced compression or welding of the coil to the utmost capacity of the machine, and after which, by its continued movement, the spindle B' and roll C' fall by their own gravity, owing to their relation with the cam, and thus permit the ring F to be removed and the substitution of another coil to be welded; and to produce this operation the gearing $r$, $r'$, and $r^2$ is suitably arranged. if sprocket wheel and chain-gearing are used, as shown, the wheel $r'$ on the spindle $B^2$ being the number of times greater than the wheel $r$ on the spindle B that the number of revolutions of the rolls is desired or necessary to exceed that of the cam. The ring F is then ready to be operated upon by the shaping-machine.

What I claim as new, and desire to secure by Letters Patent, is—

1. In a rolling-machine, the combination of housings A, a rotary spindle, B, a roll, C, on the spindle B, without a housing, A, an oscillating spindle, B', a roll, C', on the spindle B', without a housing, A, adjacent to the roll C, and means, substantially as described, for oscillating the spindle B', substantially as set forth.

2. In a rolling-machine, the combination of housings A, a stationary rotary spindle, B, a roll, C, on the spindle B, without a housing, A, a rotary spindle, B', adjusted toward one end in its housing by means of a ball-joint, D, and oscillatory within its housing toward its opposite end, a roll, C', on the spindle B', without a housing, A, adjacent to the roll C, and means, substantially as described, for oscillating the spindle B', substantially as set forth.

3. In a rolling-machine, the combination of housings A, a stationary rotary spindle, B, a grooved roll, C, on the spindle B, without a housing, A, an oscillatory spindle, B', a roll, C', on the spindle B', without a housing, A, adjacent to the roll C and tapering toward its outer extremity, and provided with a collar, $p'$, to operate with the groove in the roll C, and means, substantially as described, for oscillating the spindle B', substantially as set forth.

4. In a rolling-machine, the combination of housings A, a rotary spindle, B, a roll, C, on the spindle B, without a housing, A, an oscillatory spindle, B', a roll, C', on the spindle B', without a housing, A, adjacent to the roll C, a rotary spindle, $B^2$, and a cam, E, on the spindle $B^2$ within a housing adjacent to the free end of the spindle B', to oscillate the spindle B', substantially as and for the purpose set forth.

5. In a rolling-machine, the combination of housings A, a stationary rotary spindle, B, a grooved roll, C, on the spindle B, without a housing, A, a rotary spindle, B', adjusted toward one end in its housing by means of a ball-joint, and oscillatory within its housing toward its opposite end, a roll, C', on the spindle B', without a housing, A, below the roll C, and tapering toward its outer extremity, and provided with a collar, $p'$, to operate with the groove in the roll C, a rotary spindle, $B^2$, below the spindle B', a cam, E, on the spindle $B^2$ within a housing adjacent to the free end of the spindle B', to oscillate the same, and suitable gearing to rotate the spindle $B^2$ once to a given greater number of revolutions of the spindles B and B', substantially as described.

JAMES J. ANDERSON.

In presence of—
HENRY HUDSON,
JULIUS W. DYRENFORTH.